Dec. 9, 1930.   J. C. FREEMAN   1,784,230
HAND GRIP ATTACHMENT FOR STEERING WHEELS
Filed Dec. 4, 1928
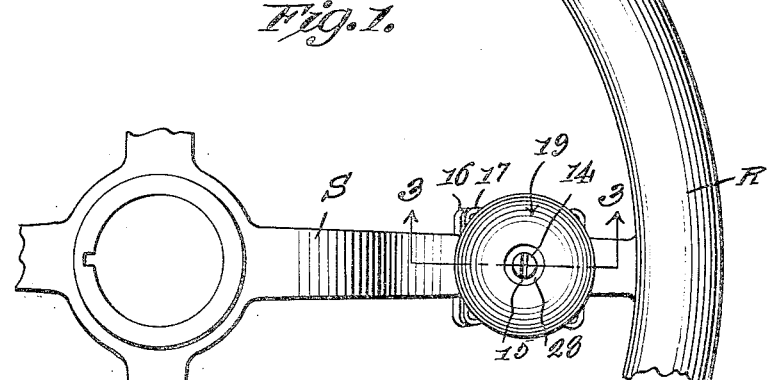
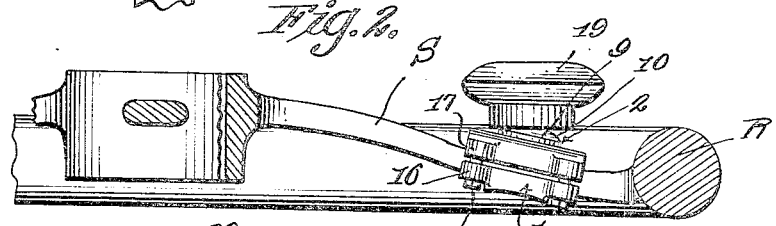
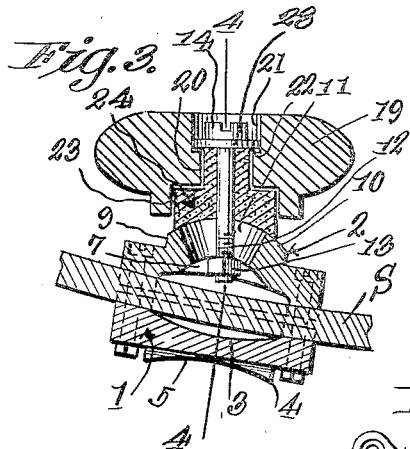
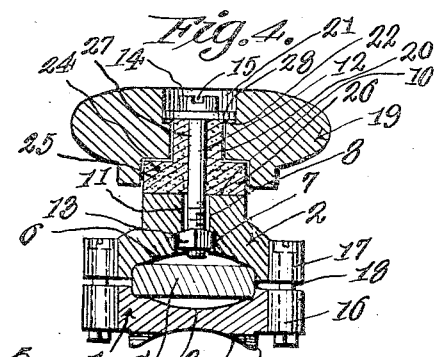
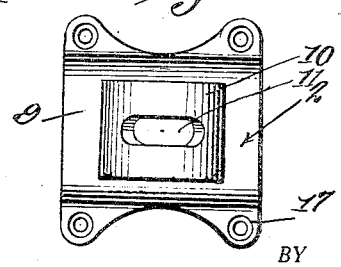
INVENTOR.
JOHN C. FREEMAN Patented Dec. 9, 1930

1,784,230

UNITED STATES PATENT OFFICE

JOHN C. FREEMAN, OF JEFFERSONVILLE, INDIANA

HAND-GRIP ATTACHMENT FOR STEERING WHEELS

Application filed December 4, 1928. Serial No. 323,622.

This invention relates to a hand grip attachment for the steering wheels of automobiles. It is a well known fact that, where drivers of automobiles are required to make rapid sharp turns in order to avoid collision or other type of accident, they often experience great difficulty in grasping and manipulating the wheel in a manner to safely effect such turns and at the same time attend to the manipulation of the gear shift and emergency brake levers, and therefore the present invention has as its primary object to provide a hand grip attachment which may be readily applied to any ordinary steering wheel and which will constitute means whereby a firm grip may be had by one hand for the purpose of rotating the wheel to steer the machine while the other hand of the driver is employed in manipulating the gear shift and emergency brake levers or either of said levers.

Another object of the invention is to provide a hand grip attachment for automobile steering wheels which attachment may, by a simple relative adjustment of its component parts, be adapted to any of the spokes of any steering wheel regardless of the curvature of the spokes or their cross sectional contour, the invention therefore contemplating an attachment which is universally adaptable to steering wheels.

Another object of the invention is to provide a hand grip attachment for automobile steering wheels embodying a clamping unit and a hand grip together with means for so connecting the hand grip with the attachment unit or clamping unit that the hand grip may be adjusted to assume any desired angle which the driver may find most convenient.

Another object of the invention is to provide a hand grip attachment so constructed that, by its use, a steady force may be exerted by one hand against the wheel.

While the accompanying drawings and the description which is to follow, constitute a disclosure of the preferred embodiment of the invention, it will be understood that various changes may be made within the scope of what is claimed.

In the accompanying drawing:

Figure 1 is a plan view of the hand grip attachment embodying the present invention, installed upon one of the spokes of an automobile steering wheel, a portion of the wheel being likewise shown in top plan;

Figure 2 is a view in rear elevation of the attachment installed, the steering wheel being shown in vertical section;

Figure 3 is a detail vertical sectional view taken substantially on the line 3—3 of Figure 1 looking in the direction indicated by the arrows;

Figure 4 is a vertical front to rear sectional view taken substantially on the line 4—4 of Figure 3;

Figure 5 is a top plan view of one of the members of the clamp unit of the attachment.

As illustrated in the drawing, the attachment is designed for application to one of the spokes of a steering wheel and therefore embodies a clamping unit adapting it for adjustable application to the spoke. The clamping unit comprises members indicated in general one by the numeral 1 and the other by the numeral 2 and these members are designed to be disposed respectively beneath and above the steering wheel spoke which is indicated by the reference letter S. The members 1 and 2 of the clamping unit of the attachment are preferably of metal and each is in the nature of an integral one part casting and, as shown in the drawing, the member 1 is formed in its upper face with a shallow recess 3 which is concave as illustrated in Figures 3 and 4 of the drawing so as to adapt this face to be disposed against the under side of the spoke S of the steering wheel adjacent that end which connects with the rim R of the said wheel, and the body of the member 1 is formed upon its under face with a boss 4 which has a concave recess 5, this formation of the faces of the member 1 adapting the same to be applied to steering wheel spokes of different cross sectional and longitudinal contours.

The member 2 of the clamping unit comprises a cast body which has a concave shallow recess 6 in its under face and this face of the said body is likewise formed with a longitudinally extending groove 7, the said groove being in fact formed in the wall of the recess and serving a purpose which will presently be described. A slot 8 is formed longitudinally in the body of the member 2 and it will be observed by reference to Figures 3 and 4 of the drawing that the body of this member has a boss 9 formed upon its upper side, the upper surface of the boss being longitudinally curved upwardly on the arc of a circle as indicated by the numeral 10 and the slot 8 being of arcuate form due to the fact that the wall of the recess 7 and the curved surface 10 of the boss 9 are concentric. This slot accommodates the lower threaded end 11 of a clamping bolt 12 by means of which the hand grip unit, to be presently described, is held in position upon the section 2 of the clamping unit, a nut 13 being applied to the threaded end 11 of the said bolt 12 and being received within the groove 7 and contacting at opposite faces with the wall of the groove whereby it is held against rotation and whereby the bolt may be adjusted by the application of a screw driver to the head of the bolt which is indicated by the numeral 14 and which is provided with the usual diametric groove 15 to accommodate the bit of the screw driver. The members 1 and 2 are formed at their four corners with apertured ears 16 and 17 through which are fitted clamping bolts 18 by means of which the two sections 1 and 2 are clamped in engagement with the under and upper sides, respectively, of the spoke S of the steering wheel upon which the attachment is mounted.

The hand grip unit comprises a hand knob which is indicated by the numeral 19 and which may be of any material found suitable for the purpose as for example wood, hard rubber, or the like, and this knob is formed centrally with a bore 20 having an enlarged outer end 21 providing a shoulder 22, and the inner end of the bore is enlarged as indicated by the numeral 23, where it opens through the under side of the knob 19. A bushing 24 is assembled with the hand knob 19 and comprises a cylindrical body 25 which is fitted into the enlarged lower end 23 of the bore 20 of the said knob 19 and which is formed with a concavely curved under face 26 snugly seating against the convexly curved face 10 of the boss 9 of the section 2 of the coupling unit. This bushing is provided axially with a bore 27 through which the bolt 12 is fitted, and the lower end of this bore registers with the slot 8 in the section 2 of the attaching unit, the nut 13 upon the threaded lower end of the bolt engaging in the groove 7, as previously stated, and being in this manner held against rotation so that the bolt may be loosened and tightened to permit of adjustment of the hand knob 19 to assume any desired position of angular adjustment found most convenient by the user of the attachment. A washer 28 is preferably provided upon the bolt 12 to seat upon the upper end of the bushing 24 and it will be observed by reference to Figures 3 and 4 of the drawing that the neck of the bushing 24 which fits in the bore 20, is located slightly above the shoulder 22 in the bore so that, when the bolt is tightened, the surfaces of the bushing body and the boss 9 will mutually bind thus holding the hand knob in the desired position of adjustment. It will be observed however that, while tightening of the nut 13 will cause binding of the bushing 24 against the bearing surface of the boss 9 of the section 2 of the clamp to securely hold the boss in different positions of angular adjustment radial to the arc described by the coacting surfaces of the bushing and boss, the washer 28 does not bind the shoulder 22 and therefore the knob 19 is entirely free to rotate about the said bushing.

From the foregoing description and from an inspection of Figures 1 and 2 of the drawing it will be observed that the attachment is mounted upon one of the spokes S of the steering wheel, depending upon which spoke is found most suitable to the user, and is so adjusted that the hand knob 19 will be suitably spaced from the rim 4 of the wheel so as to permit the hand to readily grasp the knob without interference on the part of the rim and it will further be evident that, due to the construction of the attachment embodying the invention, the driver of an automobile may readily manipulate the steering wheel with a steady application of force thereto by the use of one hand while his other hand is employed in manipulating the gear shift lever or the gear shift lever and subsequently the emergency brake thus affording the driver better and more certain control over the machine than is possible where dependence is placed upon the ordinary steering wheel, alone. It will be evident that inasmuch as the hand knob 19 is freely rotatable, no strain whatsoever is imposed upon the wrist of the driver's hand in a lateral direction such as would be imposed if the knob were fixed and therefore the driver is enabled to exert a direct forward thrust upon the knob or a direct rearward pull thereon to effect rotation of the steering wheel either toward the left or toward the right and will experience no inconvenience in thus rotating the wheel through the medium of the device embodying the invention.

Having thus described the invention, what I claim is:

1. A hand grip attachment for automobile steering wheels comprising an attaching unit embodying clamping members for disposal against the upper and under sides of a spoke of the wheel, means connecting the members for clamping engagement with the spoke, a member disposed above the upper clamping member of the attaching unit, the said upper member of the attaching unit and the last mentioned member having contacting arcuate surfaces, means connecting the said members to provide for adjustment of the second mentioned member, and a hand knob upon the second mentioned member.

2. A hand grip attachment for automobile steering wheels comprising an attaching unit embodying clamping members for disposal against the upper and under sides of a spoke of the wheel, the under member having a longitudinally concave recess in one face and a boss having a recess, located upon the other face of the member, thus adapting the member for reverse attachment to wheel spokes of different shapes, means connecting the members for clamping engagement with a spoke, and a hand knob angularly adjustable upon the upper one of said members.

3. A hand grip attachment for automobile steering wheels comprising an attaching unit embodying upper and lower clamping members for disposal against the upper and under sides, respectively, of a spoke of the wheel, means for connecting the members for clamping engagement with the spoke, the upper member having a boss thereon having a convex upper surface, the said upper member being provided with a slot extending diametrically of said boss, a hand knob having a member provided with a concave surface fitting the surface of the boss, and a bolt fitted through the hand knob and through the said slot and constituting means for holding the hand knob in different positions of angular adjustment.

In testimony whereof I affix my signature.

JOHN C. FREEMAN.